United States Patent
Lin et al.

(10) Patent No.: US 8,041,977 B2
(45) Date of Patent: Oct. 18, 2011

(54) NOTEBOOK BATTERY REPLACEMENT TIME-SAVING METHOD AND BATTERY DETECTOR THEREOF

(75) Inventors: Yung-Sen Lin, Sijhih (TW); Kun Yuan Hsiao, Sijhih (TW)

(73) Assignee: Acer Incorporated, Taipei County (TW)

( * ) Notice: Subject to any disclaimer, the term of this patent is extended or adjusted under 35 U.S.C. 154(b) by 1105 days.

(21) Appl. No.: 11/882,964

(22) Filed: Aug. 8, 2007

(65) Prior Publication Data
US 2008/0222439 A1 Sep. 11, 2008

(30) Foreign Application Priority Data
Mar. 9, 2007 (TW) .............................. 96108266 A

(51) Int. Cl.
*G06F 1/00* (2006.01)
*G06F 11/30* (2006.01)
(52) U.S. Cl. ........................................................ 713/340
(58) Field of Classification Search .................. 713/300
See application file for complete search history.

(56) References Cited

U.S. PATENT DOCUMENTS

| | | | | |
|---|---|---|---|---|
| 4,458,307 A * | 7/1984 | McAnlis et al. | ................ | 714/22 |
| 4,763,333 A * | 8/1988 | Byrd | ................ | 714/22 |
| 5,386,552 A * | 1/1995 | Garney | ................ | 714/10 |
| 7,091,701 B2 * | 8/2006 | Turner et al. | ................ | 320/166 |
| 7,330,101 B2 * | 2/2008 | Sekura | ................ | 340/309.4 |
| 7,612,592 B2 * | 11/2009 | Parikh | ................ | 327/175 |
| 2008/0010514 A1 * | 1/2008 | Liu | ................ | 714/14 |

\* cited by examiner

*Primary Examiner* — Mohammed H Rehman
(74) *Attorney, Agent, or Firm* — Jianq Chyun IP Office

(57) ABSTRACT

A method to save time needed in battery replacement for a Notebook and a battery detector thereof is comprised of having placed the battery detector containing a voltage detection circuit and a register module in the Notebook. When the power level of the battery falls below a first threshold, a prompt menu including a battery replacement option is displayed. When battery replacement option is selected, the Notebook enters a sleep mode and a numeric value marking the need of an automatic power on for the Notebook is stored in the register module. If the voltage detected by the voltage detection circuit is greater than a second threshold, and a numeric value marking the need of an automatic power on for the Notebook is stored in the register module, the Notebook is driven to perform a power on procedure.

10 Claims, 4 Drawing Sheets

NOTEBOOK BATTERY REPLACEMENT TIME-SAVING METHOD AND BATTERY DETECTOR THEREOF

CROSS-REFERENCE TO RELATED APPLICATION

This application claims the priority benefit of Taiwan application serial no. 96108266, filed on Mar. 9, 2007. The entirety of the above-mentioned patent application is hereby incorporated by reference herein and made a part of this specification.

BACKGROUND OF THE INVENTION (a) Field of the Invention

The present invention is related to a battery power control circuit and its control method, and more particularly, to one that shortens the battery replacement time for a Notebook.

(b) Description of the Prior Art

Battery in a Notebook usually maintains its level for use of 2~4 hours. Once the battery power is consumed up, the user has to either use a power line to obtain operating power from a power socket, or closes the running application and powers off the notebook for replacing the battery. However, it is not very convenient for a user who spends longer time with his Notebook since it takes a couple of minutes to replace the battery and activate the interrupted application all over again.

SUMMARY OF THE INVENTION

The primary purpose of the present invention is to provide a method for shortening battery replacement time for a Notebook and a battery detector thereof to extend service hour of the Notebook and facilitate battery replacement.

To achieve the purpose, the method for shortening the battery replacement time for a Notebook includes the following steps: arranging a battery detector including a voltage detection circuit and a register module in the Notebook; detecting the power level of the battery in the Notebook; displaying a prompt menu including option of battery replacement on the monitor of the Notebook when the voltage of the battery detected is lower than a first threshold; driving the Notebook into a sleep mode and storing a numeric value marking the need of automatic power on for the Notebook in a register module when the option of battery replacement is selected; and driving the Notebook to run a power on procedure when a voltage detected by the voltage detection circuit is greater than a second threshold and the numeric value stored in the register module marks that the Notebook needs automatic power on.

To shorten the battery replacement time for the Notebook, the battery detector includes a voltage detection circuit and a register module both electrically connected to an embedded control (EC) in the Notebook. The voltage detection circuit detects the voltage of the battery of the Notebook, and the register module stores a numeric value to mark if automatic power on of the Notebook is required. Wherein, when the voltage detected by the voltage detection circuit is greater than a threshold and the numeric value stored in the register module marks that automatic power on, the EC produces a trigger off signal to drive the Notebook to start a power-on procedure.

DETAILED DESCRIPTION OF THE PREFERRED EMBODIMENTS

Figure 1:
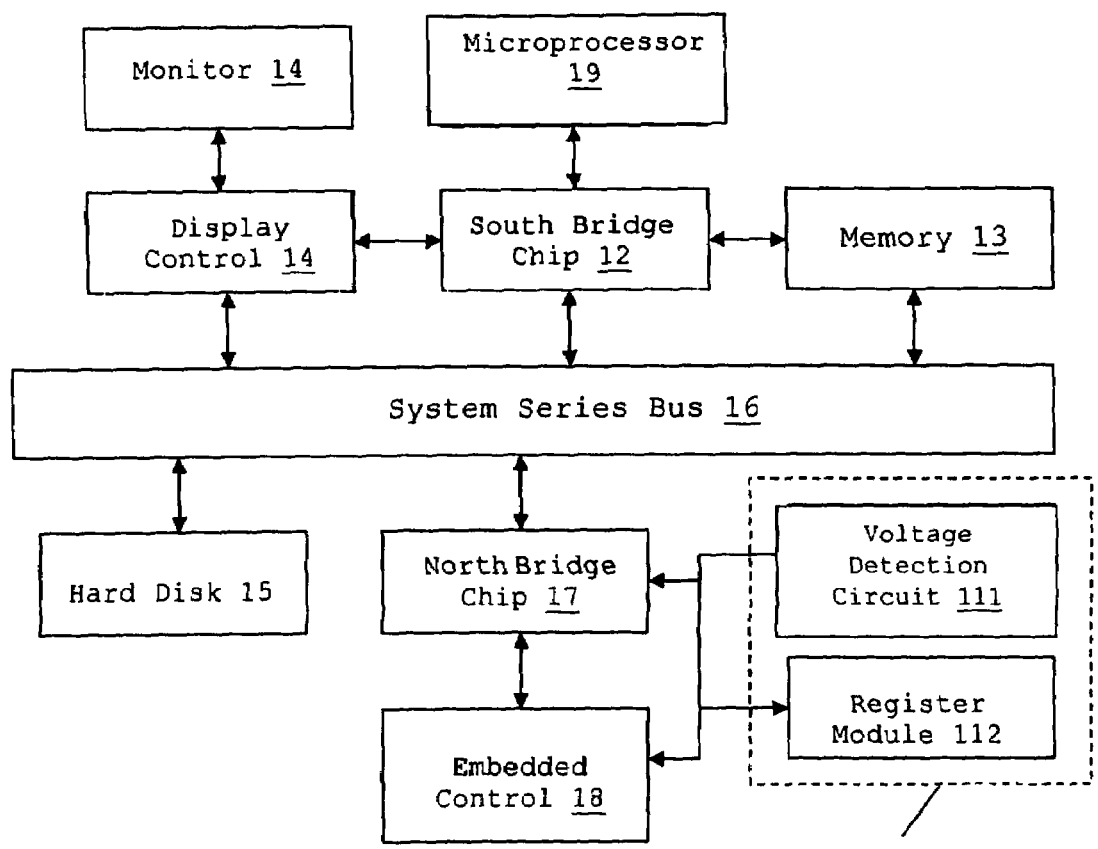
FIG. 1 is a block chart of a preferred embodiment of a battery detector of the present invention.

Referring to FIG. 1 for a block chart of a preferred embodiment of a battery detector in a Notebook of the present invention, a battery detector 11 is adapted to a Notebook; and the Notebook includes a microprocessor 19, a north bridge chip 12, a display control 14, a monitory 141, a memory 13, a system serious bus 16, a hard disk 15, a south bridge chip 17, and an embedded control 18. The battery detector 1 includes a voltage detection circuit 111 and a register module 112. The microprocessor 19 accesses to the memory 13 through the north bridge chip 12 for accessing data. The display control 14 processes image data and drives the monitor 141 to display the processed data. The embedded control 18 electrically connected to the south bridge chip 17 to detect battery voltage and AV source voltage. The hard disk 15 is electrically connected to the system series bus 16. When the Notebook enters into a sleep mode of the S4 Suspend to Disk status as defined in Advanced Configuration & Power Interface (ACPI) standard, the operating status of an operation system and associate applications are stored in the hard disk 15. Because the data stored in the HD 15 will not be lost without power supply, a user wouldn't have to worry about loss of data while replacing the battery when the Notebook is in S4 sleep mode.

The battery detector 1 is electrically connected to both of the EC 21 and the south bridge chip 17. The voltage detection circuit 111 detects a voltage of a battery plugged in the Notebook, and the register module 112 stores a numeric value that marks whether automatic power on for the Notebook is required. When a voltage detected by the voltage detection circuit 111 is greater than a predetermined voltage, it indicates a battery with sufficient power has been plugged in the Notebook. The numeric value stored in the register module also marks that automatic power on of the Notebook is required, and the embedded control produces a trigger signal to the south bridge chip 17 to drive the Notebook to execute a power on procedure.

Figure 2:
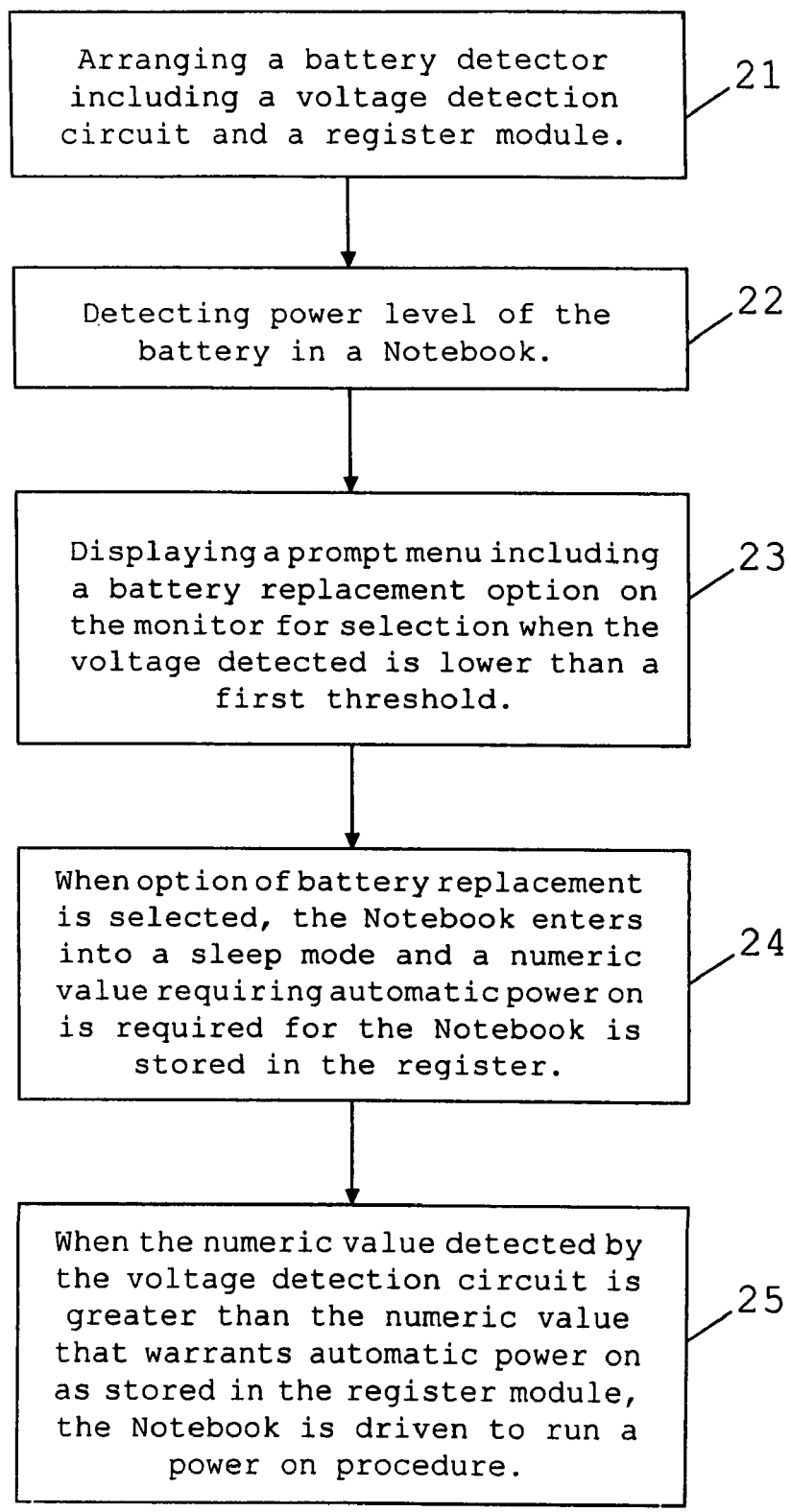
FIG. 2 is a flow chart showing the process of shortening the battery replacement time for a Notebook of the present invention.

Referring to FIG. 2 for a flow chart showing the process of time-saving battery replacement of the Notebook, the method applicable to a Notebook containing a battery and a monitor is comprised of the following steps of:

Step 21: Arranging a battery detector including a voltage detection circuit and a register module.

Step 22: Detecting power level of the battery in a Notebook.

Step 23: Displaying a prompt menu including an option of battery replacement on the monitor for selection when the voltage detected is lower than a first threshold for the user to select.

Step 24: When the option of battery replacement is selected, the Notebook enters into a sleep mode and the numeric value, e.g., a binary "1" requiring automatic power on is required for the Notebook is stored in the register module. Wherein, the sleep mode is related to the S4 (Suspend to Disk) disk sleep mode as defined in ACPI standard; and Step 25: When the voltage detected by the voltage detection circuit is greater than a second threshold, it indicates a battery with sufficient power has been plugged in the Notebook, and the numeric value stored in the register module also marks that an automatic power on of the Notebook is required, the Notebook is driven to run a power on procedure.

The register module is preferred to be a non volatile RAM, a complementary Metal-Oxide Semiconductor (CMOS) device or a Real Time Clock; and the first threshold and the second threshold are each preferred to fall between the range of zero volt and 10% of the voltage of the battery.

Figure 3:
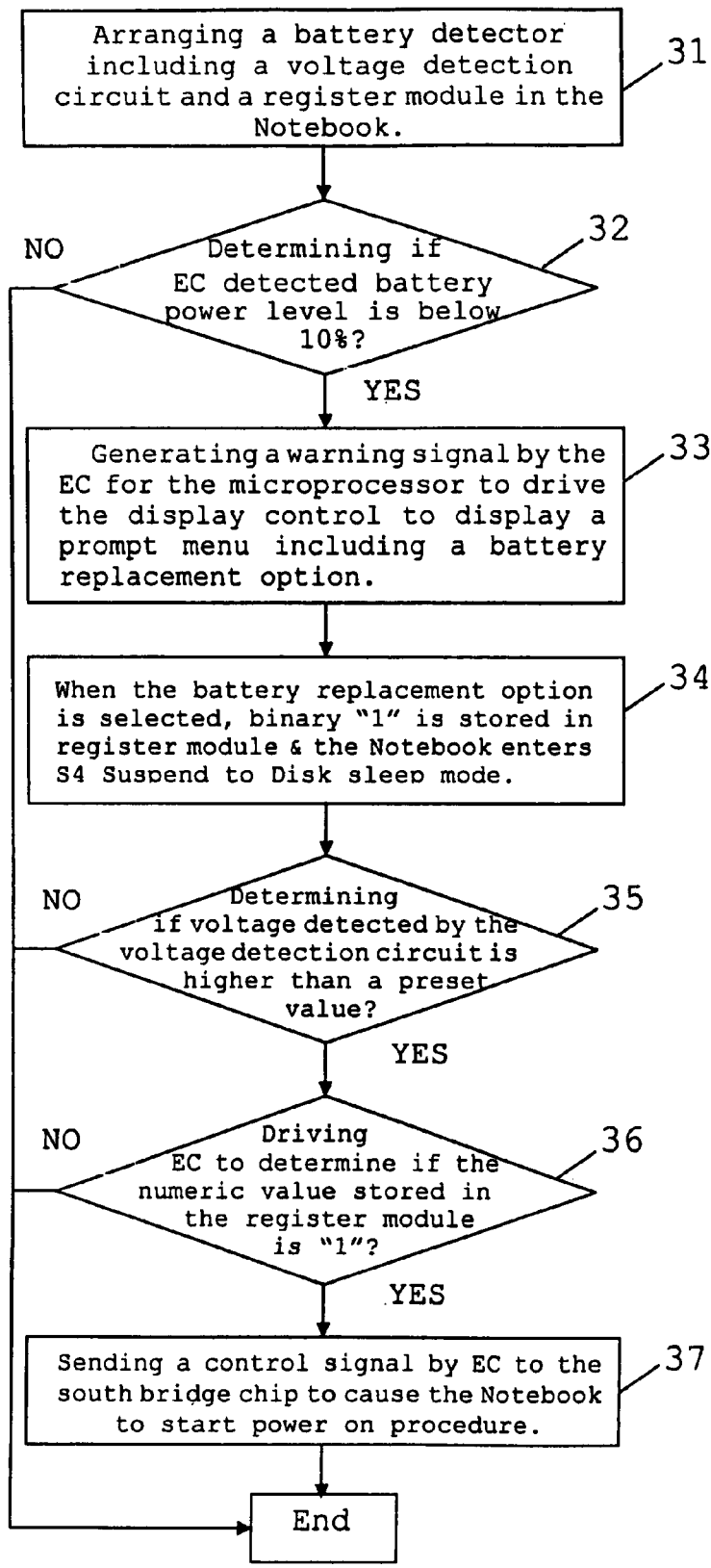
FIG. 3 is a flow chart showing the process of shortening the battery replacement time for a Notebook of the preferred embodiment of the present invention.
Figure 4:
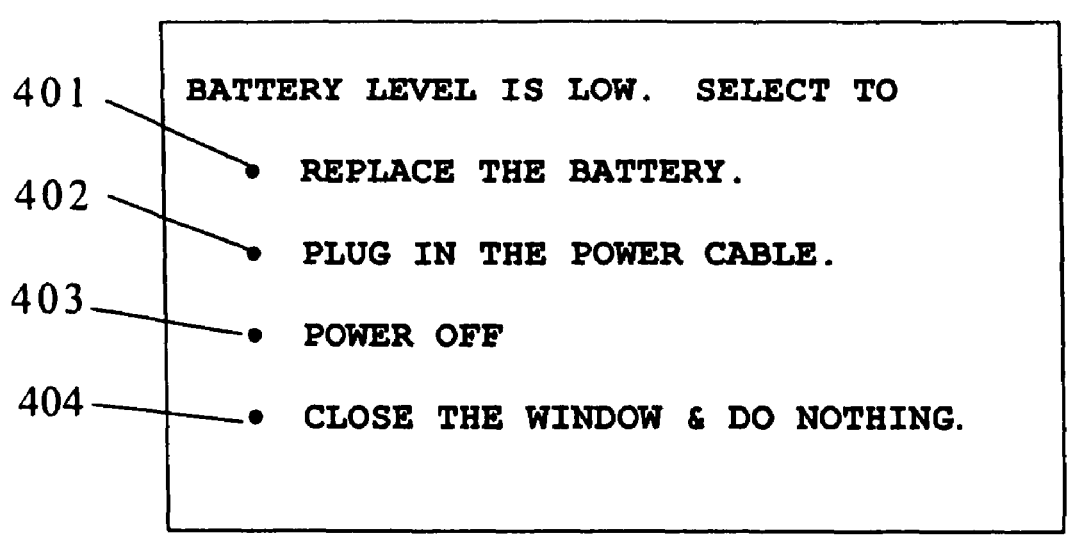
FIG. 4 is a schematic view showing a prompt menu pop-up in the present invention.

Now referring to FIGS. 3 and 4, for a preferred embodiment of time-saving battery replacement for a Notebook and a schematic view of the operation of the present invention, the preferred embodiment provided corresponding to the block chart of a Notebook as illustrated in FIG. 1 includes the following steps of:

Step 31: arranging a battery detector 1 including a voltage detection circuit 111 and a register module 112 in the Notebook. The voltage detection circuit 111 detects if a battery is plugged into the Notebook and an initial value of a binary numeric value of "0" is stored in the register module 112.

Step 32: using the EC 18 to detect the power level of the battery of Notebook and determine whether or not the power level is below a first threshold. If yes, go to Step 33; if not, end this flow.

Step 33: generating a warning signal by the EC 18 for the microprocessor 19 to drive the display control 14 to display a prompt menu 40 including an option of battery replacement on the monitor 141, as illustrated in FIG. 4. The menu 40 includes a battery replacement option 401, a plug in a power source option 402, a power-off option 403, and a doing nothing option 404 for the user to select while the first threshold may be set with the range of 0V and 10% voltage of the power level;

Step 34: When the battery replacement option 401 is selected by the user, the register module 112 stores the binary numeric value of "1", then the Notebook enters in S4 Suspend to Disk sleep mode. The Notebook will store then current running status of the operation system and applications, and associate data into the hard disk 15. The user may start replacing the battery after the Notebook has entered into the sleep mode;

Step 35: Determining whether r not the voltage detected by the voltage detection circuit is higher than a predetermined value. If yes, it indicates that a battery with sufficient voltage has been plugged into the Notebook; and the user may go to Step 36. If not, end this process;

Step 36: Driving the EC 18 to determine whether or not the numeric value stored in the register module is "1". If yes, go to Step 37; if not, end this process; and Step 37: Sending a control signal by EC 18 to the south bridge chip 17 so that the Notebook performs a power-on procedure to read out those data stored during the sleep mode in the S4 Disk from the hard disk 15, and returns to the operating status before the battery replacement option 401 has selected by the user; and the register module 112 stores a binary numeric value of "0".

Furthermore, upon executing Step 33 with the battery replacement option being selected by the user, the monitor 141 displays a message in a window, e.g., "Replace the battery only after the power indicator is off" to inform the user when to replace the battery. Besides, a bridge batter may be added to the Notebook as applicable to provide voltage that may be needed by the Notebook upon entering into S4 disk sleep mode. Therefore, the user may forthwith replace the battery after selecting the battery replacement option 401 to further shorten the time needed in replacing the battery for the Notebook.

Upon executing Step 32, if the plug in the power line 402, power off option 403 or doing nothing option 404 is selected, the numeric value stored in the register module 112 remains at "0" and the Notebook performs the general process that is familiar for those who work in this field of art, thus will not be elaborated herein. Since the numeric value stored in the register module 112 is "0", the Notebook will not automatically execute the power on procedure.

For those who works longer time, e.g., more than four hours, with a Notebook and there is no power socket nearby only with multiple batteries are available, the process described above may be employed when the prompt menu including the battery replacement option is displayed, user just selects the battery replacement option and waits the Notebook to enter sleep mode. After the battery is replaced, The Notebook will automatically power on to return to the operating status before battery replacement for the user to continue operation without interruption.

It is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

What is claimed is:

1. A method for shortening a battery replacement time for a Notebook containing a monitor and a battery, and said method comprising the steps of:
   arranging a battery detector containing a voltage detection circuit and a register module in said Notebook;
   detecting power level of said battery;
   displaying a prompt menu including a battery replacement option on said monitor when said detected voltage is lower than a first threshold, wherein said prompt menu further includes a power off option, a plug in power line option and a doing nothing option;
   driving said Notebook to enter a sleep mode and storing a numeric value marking that said Notebook needs an automatic power on in said register module when said battery replacement option is selected; and
   driving said Notebook to perform the automatic power on procedure when a voltage detected by said voltage detection circuit is greater than a second threshold and said numeric value stored in said register module marks that a restart of the Notebook is needed.

2. A method as claimed in claim 1, wherein said first threshold falls within the range of 0V and 10% of voltage of said battery.

3. A method as claimed in claim 1, wherein said second threshold falls within the range of 0V and 10% of voltage of said battery.

4. A method as claimed in claim 1, wherein said sleep mode is related to a S4 disk suspend to disk as defined in the ACPI standard.

5. A method, as claimed in claim 1, wherein said Notebook further includes a bridge battery to provide a power required while said Notebook is driven to enter said sleep mode.

6. A method as claimed in claim 1, wherein said Notebook further includes an embedded control (EC) to detect power level of said battery.

7. A method as claimed in claim 1, wherein said register module is related to a nonvolatile RAM, a complementary metal-oxide semiconductor (CMOS) device or a real time clock.

8. A battery detector capable of shortening a battery replacement time for a Notebook including an embedded controller, and said battery detector comprising:

a voltage detection circuit, electrically connected to said embedded control, and for detecting a voltage of a battery plugged in said Notebook, wherein said Notebook comprises a monitor for displaying a prompt menu that comprises a battery replacement option, a power off option, a plug in power line option and a doing nothing option; and a register module, electrically connected to the embedded control, and for storing a numeric value marking if said Notebook needs an automatic power on;

wherein, said embedded control produces a trigger signal for driving said Notebook to perform the automatic power on procedure when said voltage detected by said voltage detection circuit is greater than a threshold and said numeric value stored in said register module marks that said Notebook needs said automatic power on.

9. The battery detector as claimed in claim 8, wherein said register module is related to a nonvolatile RAM, a CMOS device, or a real time clock.

10. The battery detector as claimed in claim 8, wherein said numeric value marking whether the notebook needs said automatic power on is related to a binary numeric value.

* * * * *